J. G. FOREMAN.
Cutting-Pliers.
No. 163,175. Patented May 11, 1875.
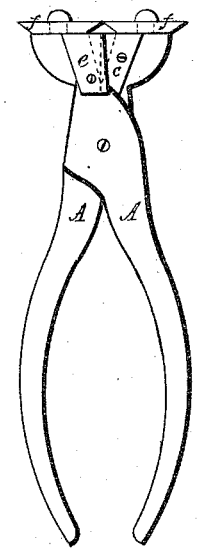
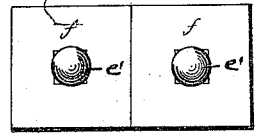
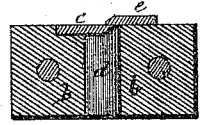
WITNESSES.
INVENTOR.

UNITED STATES PATENT OFFICE.

JAMES G. FOREMAN, OF CORRY, PENNSYLVANIA.

IMPROVEMENT IN CUTTING-PLIERS.

Specification forming part of Letters Patent No. 163,175, dated May 11, 1875; application filed March 1, 1875.

*To all whom it may concern:*

Be it known that I, JAMES GUY FOREMAN, of Corry, in the county of Erie and State of Pennsylvania, have invented certain new and useful Improvements in Nippers; and I do hereby declare the following to be a full, clear, and exact description of the invention, such as will enable others skilled in the art to which it pertains to make and use it, reference being had to the accompanying drawings, which form part of this specification.

My invention relates to an improvement in nippers; and consists in attaching to the upper ends of the nippers rectangular blades, having cutting-edges on all sides, so that when the edges become dull on one side they may be turned around, so as to present new edges, as will be more fully described hereafter.

The accompanying drawing represents my invention.

A represents the handles of the nippers, pivoted in the usual manner, and formed of any desired shape, but provided with shoulders, by which they are prevented from closing any nearer than to bring the cutting-blades together. The jaws $b$ of the nippers, when the handle is closed so that the shoulders meet, leave an opening, $d$, between them. In one of these jaws is a cutting-blade, $c$, countersunk, so as to be flush with the surface, and to the surface of the other a similar blade, $e$, is attached, so that when brought together the one will slightly overlap the other like a pair of shears. These two blades cut and act like shears or scissors, allowing the cut parts to pass through the aperture immediately behind the blades. The upper part of the jaws is flat, and on the top of each is formed a square tenon, on which tenons are secured square sharp-edged blades $f$, thick in the middle, and tapering toward the edges. The sharp edges of these blades, when the handles are closed, come together, so that they cut in the usual manner, and the opening under them, between the jaws, gives room for the cut parts to pass out. These square blades are held on top of the upper flat ends of the jaws, by the square tenons entering into corresponding square openings in the center of the blades, and by screws or any other suitable means, and are set in such a manner as to come in contact with each other when the shears close.

Should either of the sharp edges be worn or have become dull, the blade may be turned, so as as to present another cutting-edge. These square blades may be placed at the side instead of at the top of the nippers, and made reversible in the same manner, as stated.

Having thus described my invention, I claim—

The rectangular blades $ff$, having cutting-edges on all sides, adjusted and secured as specified, and for the purpose shown.

In testimony that I claim the foregoing I have hereunto set my hand this 23d day of February, 1875.

JAMES GUY FOREMAN.

Witnesses:
  S. A. HOLLISTER,
  F. D. WEBSTER.